United States Patent [19]

Hoogenbosch

[11] 4,201,400
[45] May 6, 1980

[54] TOWING DEVICE

[75] Inventor: Thomas C. Hoogenbosch, Boronia, Australia

[73] Assignee: J. & A. Atlas Nominees Pty. Ltd, Victoria, Australia

[21] Appl. No.: 924,700

[22] Filed: Jul. 14, 1978

[51] Int. Cl.² .............................................. B60D 1/06
[52] U.S. Cl. ..................... 280/511; 403/131
[58] Field of Search ........................ 280/504, 511, 515; 85/5 B, 5 CP; 285/271, 269; 403/131, 129, 128

[56] References Cited

U.S. PATENT DOCUMENTS 2,189,710  2/1940  Draeger ............................. 280/511
2,901,804  9/1959  Williams ............................. 85/513 X

FOREIGN PATENT DOCUMENTS 66156  8/1975  Australia .................................. 280/511
644159  10/1950  United Kingdom ...................... 280/511

Primary Examiner—Robert R. Song
Assistant Examiner—Randall A. Schrecengost
Attorney, Agent, or Firm—Andrus, Sceales, Starke & Sawall

[57] ABSTRACT

The present invention provides a towing device comprising a towball and latching means releaseably operable to, in use, secure the towball to the draw bar of a vehicle.

6 Claims, 2 Drawing Figures

TOWING DEVICE

BACKGROUND TO THE INVENTION

1. Field of the Invention

This invention relates to a towing device.

2. Prior Art

It is known to fit a ball mounted on a shank to a draw bar of a vehicle for forming a ball and socket coupling with a trailer or like but, when the vehicle is not in use as a towing vehicle, it is common to leave the ball and shank in place on the draw bar and this may result in an obscuring of a number plate which is an offence against the law.

Further, a towball and shank left in place will become dirty, grease applied thereto will deteriorate and the shank, which is provided with a thread to facilitate removal, may rust and make removal difficult or impossible.

It must also be pointed out that such towballs and shanks are rarely easy to remove and as towballs are available in different sizes to suit different purposes it is sometimes necessary that a particular towball be removed and replaced by another towball.

SUMMARY OF THE INVENTION

The present invention provides a towing device comprising a towball and latching means releaseably operable to, in use, secure the towball to the draw bar of a vehicle.

DESCRIPTION OF PREFERRED ASPECTS

In a preferred aspect the present invention provides a towing device comprising means adapted to be secured to a draw bar of a vehicle, a towball, and latching means releaseably operable to secure the towball to said means adapted to be secured to a draw bar of a vehicle.

In a more preferred aspect, the present invention provides a towing device comprising a sleeve adapted to be secured to the draw bar of a vehicle, and an element comprising a towball, and a shank attached to the towball and receivable in said sleeve; and wherein the towing device further includes latching means releaseably operable to secure the shank within said sleeve whereby to releaseably secure said element to said sleeve.

Part of said latching means is preferably carried within said element.

The shank and sleeve are preferably formed to co-operate to restrict the shank against rotation when received in the sleeve. This may be achieved, for instance, by means of splines, key and keyway or non-circular shapes and in a preferred aspect the shank has a pin which is receivable in a slot in the sleeve.

The latching means preferably comprises an aperture and means adapted to enter or be withdrawn from that aperture. In a preferred construction a shaft passes through the shank and the towball and releasably urges means to project from the shank to be received in an aperture in the sleeve.

This invention also provides a sleeve suitable for use with the element and an element suitable for use with the sleeve.

A specific construction of a towing device in accordance with this invention will now be described with the aid of the accompanying drawings.

DETAILED DESCRIPTION

Figure 1:
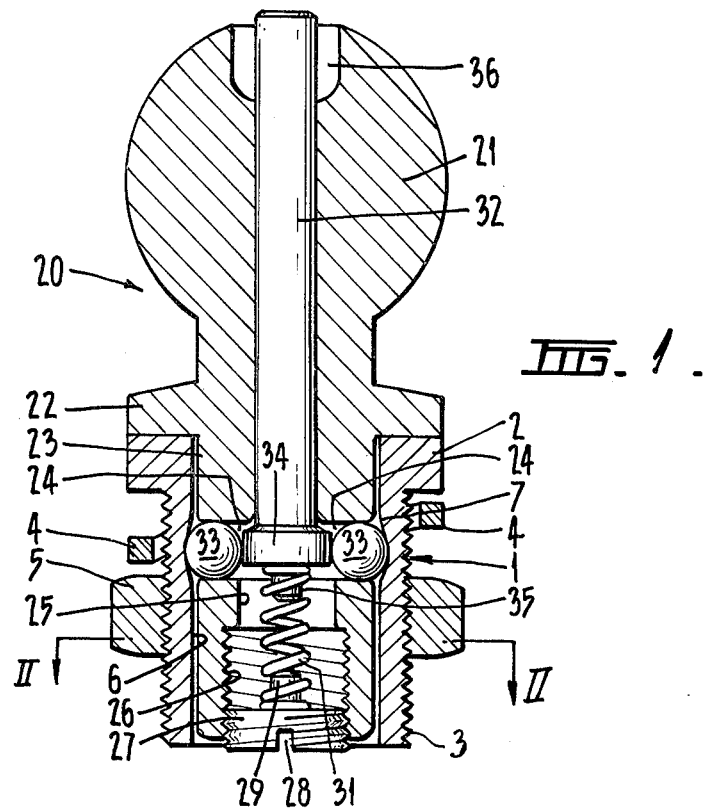
FIG. 1 is a vertical cross-sectional view of the device.
Figure 2:
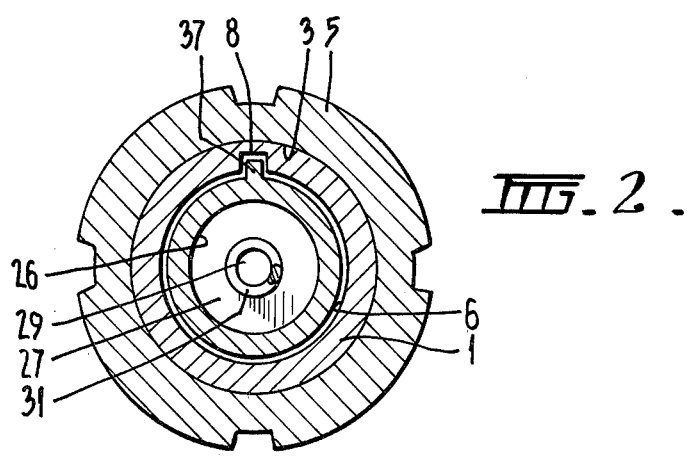
FIG. 2 is a cross-section on line II—II in FIG. 1.

The towing device shown in the drawings includes a sleeve 1 having a flange 2, an externally threaded surface 3 on which a spring washer 4 and locknut 5 are located, an internal bore 6, an annular groove 7 and a longitudinally extending groove 8.

The towing device further includes an element 20 comprising a towball 21, a flange 22, a shank 23, transverse bores 24 and a longitudinal bore 25. The longitudinal bore 25 is internally screwthreaded at 26 and an externally threaded screw 27 having a screwdriver slot 28 and spring locating pin 29 is received in that thread 26. The bore 25 also contains a spring 31 and actuator 32. The bores 24 contain balls 33. The actuator 32 is enlarged at 34, has a spring locating pin 35 and projects from a recess 36 in the towball 21. A pin 37 projects from the shank 23.

In use, the sleeve 1 is fitted to an appropriately shaped hole in a draw bar of a vehicle with the flange 2 uppermost and the spring washer 4 and locknut 5 are used to secure it to the draw bar.

The element 20 is then aligned above the bore 6 and is rotated so that the pin 37 is aligned with the groove 8. The shank 23 is then inserted in the bore 6 and the actuator 32 is depressed to move the enlarged portion at 34 away from the balls 33 against the bias imparted by the spring 31. The balls 33 can then retract into the bores 24.

When the flanges 2 and 22 are in abutment, the balls 33 will be aligned with the groove 7 and if the actuator 32 is released it will be moved by the spring 31 to cause the balls 33 to project outward of the shank 23 to locate in that groove and thereby capture the element 20 to the sleeve 1.

To remove the element 20 it is only necessary to depress the actuator 32 and lift the element 20 from the sleeve 1.

The above described device is simple to use and will enable towballs to be changed or removed when not required.

The claims form part of the disclosure of this invention.

Modifications and adaptations may be made to the above described without departing from the spirit and scope of this invention which includes every novel feature and combination of features disclosed herein.

I claim:

1. A towing device removably securable to a vehicular drawbar comprising:

a sleeve adapted for mounting in a hole in the drawbar, said sleeve having an annular groove on the inner surface thereof;

a tow ball element having a tow ball, a shank receivable in said sleeve, and a flange abuttable with the end of said sleeve when said shank is received in said sleeve for locating said shank with respect to said sleeve, said shank having opposed transverse bores aligned with the annular groove of said sleeve when said shank is located in said sleeve, said element having a central longitudinal bore;

a ball located in each of said transverse bores;

an actuator located in said longitudinal bore and movable therealong, said actuator having an enlarged portion for inserting said balls in said annular groove when said actuator is positioned in a preselected position; and bias means secured in the portion of said longitudinal bore received in said sleeve and having means engaging said actuator for biasing said actuator into said preselected position, said longitudinal bore being formed to provide stop means coacting with said enlarged portion of said actuator for retaining said actuator in said preselected position when biased by said bias means.

2. The towing device according to claim 1 wherein the size of said enlarged portion is in excess of the size of the adjacent portion of said longitudinal bore to form said stop means.

3. The towing device according to claim 1 wherein said actuator extends through said tow ball and has an exposed end by which said actuator may be manipulated to move same out of said preselected position in opposition to said bias means.

4. The towing device according to claim 3 wherein said exposed end of said actuator is located in a recess in said tow ball.

5. The towing device according to claim 1 wherein said sleeve and shank are formed to restrict the shank against rotation when said shank is received in said sleeve.

6. The towing device according to claim 1 wherein said portion of said longitudinal bore received in said sleeve is threaded and said bias means is threadably secured in said bore.

* * * * *